US009677736B2

(12) United States Patent
Ravier et al.

(10) Patent No.: US 9,677,736 B2
(45) Date of Patent: Jun. 13, 2017

(54) ADAPTIVE LIGHTING SYSTEM FOR AN AUTOMOBILE VEHICLE

(71) Applicant: Valeo Vision, Bobigny (FR)

(72) Inventors: Jean-Paul Ravier, Saint Maur des Fosses (FR); Benoist Fleury, Vincennes (FR); Loic Boinet, Le Mesnil Esnard (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 13/951,639

(22) Filed: Jul. 26, 2013

(65) Prior Publication Data

US 2014/0029282 A1    Jan. 30, 2014

(30) Foreign Application Priority Data

Jul. 27, 2012  (FR) ...................................... 12 57304

(51) Int. Cl.
*F21V 11/00* (2015.01)
*F21S 8/10* (2006.01)
(Continued)

(52) U.S. Cl.
CPC ............. *F21S 48/17* (2013.01); *F21S 48/119* (2013.01); *F21S 48/1145* (2013.01);
(Continued)

(58) Field of Classification Search
CPC ........ F21S 48/177; F21S 48/119; F21S 48/17; F21S 48/1752; F21S 48/1757;
(Continued)

(56) References Cited

U.S. PATENT DOCUMENTS

| 4,868,721 A | 9/1989 | Soardo |
| 5,938,319 A * | 8/1999 | Hege ............................ 362/459 |

(Continued)

FOREIGN PATENT DOCUMENTS

| DE | 102009025678 | 1/2010 |
| DE | 102010028949 | 11/2011 |

(Continued)

OTHER PUBLICATIONS

English translation of DE102010028949A1, Reiners, Headlight Module, Nov. 17, 2011.*

*Primary Examiner* — Jong-Suk (James) Lee
*Assistant Examiner* — James Endo
(74) *Attorney, Agent, or Firm* — Jacox, Meckstroth & Jenkins

(57) ABSTRACT

An adaptive lighting system for an automotive vehicle. The adaptive lighting system has a wavelength conversion device for receiving the light radiation (L) from the primary source and re-emitting white light radiation (B).
An optical imaging system receives the white light (B) re-emitted by the wavelength conversion device and projects this light (B) in front of the vehicle to form a lighting beam, the wavelength conversion device being situated close to a focal plane of the optical imaging system, and the scanning system and the optical system being situated on the same side of the wavelength conversion device.
An intensity of the white light radiation (B) emitted by the wavelength conversion device is capable of being modulated between a minimum value and a maximum value, and the scanning is performed at variable speed.

21 Claims, 7 Drawing Sheets

(51) Int. Cl.
*G02B 26/10* (2006.01)
*G02B 26/08* (2006.01)

(52) U.S. Cl.
CPC ....... *F21S 48/1394* (2013.01); *F21S 48/1757* (2013.01); *F21S 48/1752* (2013.01); *G02B 26/0833* (2013.01); *G02B 26/101* (2013.01); *G02B 26/105* (2013.01)

(58) Field of Classification Search
CPC .. F21S 48/115; F21S 48/1154; F21S 48/1159; F21S 48/1145; F21K 9/56; B02B 19/0052; B02B 19/0057; G02B 19/0052; G02B 19/0057; G02B 26/0833; G02B 26/101; G02B 26/105; G02B 26/122
USPC ........... 362/509, 510, 311.11, 610, 230, 231, 362/259, 260, 84; 353/13
See application file for complete search history.

(56) References Cited

U.S. PATENT DOCUMENTS

| | | | |
|---|---|---|---|
| 7,347,595 B2 | 3/2008 | Brun et al. | |
| 7,580,007 B2 * | 8/2009 | Brown et al. | 345/15 |
| 8,446,342 B2 * | 5/2013 | Champion et al. | 345/15 |
| 2004/0252516 A1 | 12/2004 | Brun et al. | |
| 2004/0263943 A1 * | 12/2004 | Starkweather | 359/290 |
| 2005/0007781 A1 * | 1/2005 | Okuwaki et al. | 362/259 |
| 2006/0245199 A1 | 11/2006 | Brun et al. | |
| 2007/0091978 A1 * | 4/2007 | Tanaka et al. | 372/109 |
| 2007/0177250 A1 * | 8/2007 | Duncan | G02B 26/101 359/298 |
| 2008/0055557 A1 * | 3/2008 | Yavid et al. | 353/31 |
| 2009/0021801 A1 * | 1/2009 | Ishihara | 358/475 |
| 2009/0046474 A1 * | 2/2009 | Sato et al. | B60Q 1/076 362/466 |
| 2009/0316243 A1 * | 12/2009 | Tsuida | 359/202.1 |
| 2011/0122101 A1 * | 5/2011 | Kurozuka | G02B 26/101 345/204 |
| 2011/0222265 A1 * | 9/2011 | Drenten et al. | 362/84 |
| 2011/0249460 A1 * | 10/2011 | Kushimoto | 362/510 |
| 2012/0013852 A1 * | 1/2012 | Champion et al. | 353/31 |
| 2012/0051074 A1 * | 3/2012 | Takahashi | 362/509 |
| 2013/0058114 A1 | 3/2013 | Reiners | |

FOREIGN PATENT DOCUMENTS

| | | |
|---|---|---|
| DE | 102010028949 A1 * | 11/2011 |
| EP | 0291475 | 11/1988 |
| EP | 1442927 | 8/2004 |
| EP | 2063170 | 5/2009 |
| WO | 9911968 | 3/1999 |
| WO | 2010058323 | 5/2010 |

* cited by examiner

ADAPTIVE LIGHTING SYSTEM FOR AN AUTOMOBILE VEHICLE

CROSS-REFERENCE TO RELATED APPLICATIONS

This application claims priority to French Application No. 1257304 filed Jul. 27, 2012, which is incorporated herein by reference and made a part hereof.

BACKGROUND OF THE INVENTION

1. Field of the Invention

The present invention concerns an adaptive lighting system for an automotive vehicle, such that the light beam emitted by such a lighting system
is in compliance at all times with the regulations in force concerning automotive lighting,
allows the driver of the vehicle to benefit from optimal conditions of visibility,
does not dazzle other drivers driving on the same road, in the same direction or in the opposite direction.

2. Description of the Related Art

Given the large number of vehicles traveling on roads, it is necessary to provide drivers of said vehicles, in particular during night driving, lighting that is as best as possible adapted to the driving conditions in order to reduce the risk of accidents. In particular, it is important that the driver can have optimal vision of the road that stretches out in front of the driver as well as on the shoulders of said road, without, however, dazzling other drivers.

Currently, all vehicles traveling on the road carry road illuminating equipment, used in case of insufficient visibility, e.g. evening, night-time or during bad weather. Classically, several types of lighting exist on modern automotive vehicles:

a so-called "high beam" lighting, produced by means of projectors that emit a light beam directed towards the horizon and that lights up the whole road scene over a long distance of about 200 meters.

a so-called "low beam" lighting, produced by means of low beam projectors, or dipped lights, that emit a beam of light delimited by an upper cut-off plane, inclined by about 1% with respect to the horizontal and descending, providing the driver with visibility over a distance on the order of 60 to 80 meters. This upper descending cut-off has the goal of preventing the dazzling of other users in the road scene stretching out in front of the vehicle or on the shoulders of the road.

a so-called "fog light", used in case of reduced visibility, produced by means of projectors that emit a short-range beam, on the order of 40 meters, limited upwards by a cut-off plane, very widely spread and comprising no mounting beam likely to give rise to undesirable phenomena with the fog droplets, and to allow the driver to appreciate the immediate environment thereof.

The aforementioned projector devices, and more particularly those that are used as low beam lights, produce light beams that are perfectible when these projector devices are used in certain conditions. New functions have thus been recently devised, designated as elaborated, merged functions under the name of AFS (abbreviation for "Advanced Front-lighting System") that proposes notably other types of beams. This is notably the so-called BL function (Bending Light for lighting up a bend), that can be decomposed into a so-called DBL function (Dynamic Bending Light for mobile lighting of a bend) and a so-called FBL function (Fixed Bending Light for fixed lighting of a bend). These functions for lighting up of a bend are used in case of traveling in a curved sense and are produced by means of projectors that emit a light beam, the horizontal orientation of which varies while the vehicle moves in a straight trajectory, so as to correctly light up the parts of the road that are destined to be reached by the vehicle and that are not found along the axis of the vehicle, but in the direction that it is on the point of taking, resulting from the angle given to the driving wheels of the vehicle by the driver thereof;

the so-called Town Light function for lighting in town. This function produces the widening of a low beam type beam while slightly decreasing its range;

the so-called Motorway Light function for lighting a highway, performing the highway function. This function produces an increase of the range of a low beam by concentrating the light flux of the low beam on the optical axis of the projector device considered;

the so-called Overhead Light function for gantry lighting. This function produces a modification of a low beam so that signaling gantries situated above the road are lighted in a satisfying manner using the low beam lights;

a so-called AWL function (Adverse Weather Light for bad weather light). This function produces a modification of a low beam so that the driver of a vehicle traveling in the opposite direction is not dazzled by the light of the projectors reflected off the wet road.

Moreover, when the low beam is operating, the attitude of the vehicle can undergo more or less significant variations, due e.g. to its state of loading, its acceleration or its deceleration, that induce a variation of the inclination of the upper cut-off of the beam, having the result either of dazzling other drivers if the cut-off is raised too much, or of insufficiently lighting the road if the cut-off is lowered too much. It is then known to use a range corrector, controlled manually or automatically, to correct the orientation of the low beam projectors.

Apart from road lighting, other types of lighting in which the beam of light is descending only offer reduced visibility at the front of the vehicle for the driver thereof. These types of lighting are often insufficient to allow the driver to see the whole of the road scene in order to be able to anticipate possible obstacles or potentially dangerous situations.

To ease this inconvenience, projectors have recently been developed that supply light beams providing the driver of the vehicle equipped with these projectors with lighting comparable to that of road lighting, but in which dark zones are created in the directions in which it is not desirable to emit light, e.g. in directions in which vehicles have been detected, so as not to dazzle drivers.

These light beams, known as "Matrix Beam" or "Pixel Lighting" depending upon the technology used, involve complex projector designs, and very fine adjustments in order to obtain the desired result, that is dark zones that are variable in size and in direction.

On the other hand, a new tendency is to propose a lighting beam in which zones of the road scene containing notable details are lighted with a light intensity greater than that of the surroundings of these details, to attract more specially the attention of the driver of the vehicle to the latter.

The Applicant has already proposed, in the document EP 1 442 927, a lighting procedure for a road scene by a vehicle projector, comprising the operations:

detection of at least one person in the road scene, localization of the person in the road scene, creation, on a display, of a mask of the size and position corresponding to the person, lighting of the road scene through the display creating a shadow cast around the person, the person being detected by means of thermal detection and/or by a detection of movement, the lighting of the road through the display lighting only a zone of the road scene situated above a cut-off, the lighting of the road below the cut-off being performed by a low beam lighting.

This process, while being effective, is perfectible, in the sense that the use of a liquid crystal display or a focal lens array display, being able to be modulated by electrical control, poses problems of thermal performance.

The document WO 99/11968 is also known, concerning a device for lighting an automotive vehicle, comprising an area of electronically controlled micro-mirrors, lighted by a parallel ray light beam. Each micro-mirror can take two positions, an "active" position in which it reflects light rays towards an optical imaging system, that projects these light rays into the road scene in front of the vehicle, and an "inactive" position in which it reflects the light rays towards a light absorbing device. The micro-mirror unit modifies the distribution of the light rays to form different light beams. The light losses engendered by such a design are often very significant. Moreover, this device is very cumbersome.

The document EP 2 063 170 is also known, concerning a lighting device for an automotive vehicle, equipped with a laser source the rays of which are sent by a scanning device onto a surface arranged at the focus of an optical projection system and composed of a plurality of phosphor elements. These phosphor elements re-emit white light that is projected by a lens to form a lighting beam on the road in front of the vehicle. The phosphor segments are arranged between the laser source and the projection lens, at the focus of this lens.

Such a design presents numerous inconveniences. The fact of using phosphor elements in transmission, that is by illuminating them with a laser beam on one side and recovering the light emitted on the other side involves:

on the one hand that the thickness of the phosphor must be thin: It results from this that the device presents the danger of a non-negligible possibility that a part of the laser beam directly crosses the thickness of the phosphor, is received by the lens and is therefore projected into the road scene in front of the vehicle. Depending upon the power and emission wavelength of the laser source, this could represent a real danger for the vision of living beings present in the road scene, and cause irreversible burns on their retina, on the other hand, that the phosphor is deposited on a transparent material. Normally the phosphor is deposited on polycarbonate or on glass that are known to be poor thermal conductors. But the power of the laser radiation necessary for producing an automotive lighting beam is quite high. Significant heating of the phosphor results from this, and therefore there is a significant decrease of the conversion yield thereof of the laser radiation into white light. On the other hand, the use of transparent substrates mentioned above leads to a decrease in the efficiency of the system due to unavoidable absorption phenomena of the material and to parasitic reflections through these optics. A part of the radiation is then reflected towards the radiation source, hence there is a supplementary loss of efficiency.

In addition, the partition or the division of the phosphor surface into individual segments engenders a "pixellization" or a fractioning of the light beam projected onto the road scene, that can degrade the precision required for obtaining an efficient adaptive lighting beam. In fact, the light beam projected to infinity by the lens is only composed of images of the phosphor elements situated in the focal plane of the lens. This light beam, e.g. received by a screen at a distance from the vehicle and perpendicular to the optical axis of the lens, is formed of bright or dark spots depending on whether elements of the phosphor are lighted or not by the laser radiation, the sizes of the spots being proportional to those of the elements of the phosphor.

Such a design is therefore not suitable for forming a classic, regulation automotive lighting beam or fulfilling an AFS function that must respect the photometric values prescribed in precise parts of this beam.

In addition, the bulk of a projector according to such a design, according to which the laser source, the scanning device, the segments of the phosphor and the lens are arranged one after the other, is relatively significant and it is not easy to install such a system in an automotive vehicle.

What is needed, therefore, is an improved adaptive lighting system that overcomes one or more of the problems of the prior art.

SUMMARY OF THE INVENTION

The present invention is in this context and has the objective of proposing an adaptive lighting system for an automotive vehicle, such that the light beam emitted by such a lighting system is simultaneously and at all times:

in compliance with the regulations in force, and adapted to the instantaneous traffic conditions, taking into account:

the configuration of the road on which the vehicle is traveling, the traffic parameters on this road, such as the density of traffic, the lighting of the road scene and in general all data external to the vehicle likely to be taken into account, the parameters specific to the vehicle, e.g. the speed of said vehicle, the amount of acceleration or deceleration of said vehicle, the distribution of the load inside this vehicle and in general all data inherent to the vehicle likely to be taken into account, to provide the driver of the vehicle with lighting of the road scene that is optimal at all times, that is which provides the driver with the best possible lighting of the road scene given all of the above driving conditions, without disturbing the drivers of other vehicles or pedestrians present in the road scene lit by the adaptive lighting system.

With this goal, the present invention presents an adaptive lighting system for an automotive vehicle comprising:

at least one primary light source emitting light radiation, a scanning system receiving the light radiation from the primary light source and spatially distributing it onto the surface of a wavelength conversion device, the wavelength conversion device receiving the light radiation from the at least one primary source and re-emitting white light radiation, an optical imaging system receiving the white light re-emitted by the wavelength conversion device and projecting this light in front of the vehicle to form a lighting beam, the wavelength conversion device being situated close to a focal plane of the optical imaging system, the scanning system and the optical imaging system being situated on the same side of the wavelength conversion device.

According to the invention, the intensity of the white light radiation (B) emitted by the wavelength conversion device (20) is capable of being modulated between a minimum value and a maximum value, and the scanning is performed at variable speed.

According to other features of the invention considered separately or in combination,
- the scanning is performed along equidistant lines;
- the scanning is performed along lines of variable separation;
- the surface of the wavelength conversion device is composed of phosphor;
- the phosphor is deposited on a substrate that is reflecting for the light radiation:
- the phosphor is deposited on a substrate chosen from good thermally conducting materials;
- the surface of the wavelength conversion device is composed of a continuous and homogeneous layer of phosphor;
- the intensity of the white light radiation emitted by the wavelength conversion device can be continuously modulated between a minimum value and a maximum value;
- the minimum value is zero;
- the scanning system receiving the light radiation from the primary light source is composed of two movable mirrors oscillating around orthogonal axes;
- the scanning system receiving the light radiation from the primary light source is composed of a single micro-mirror movable around two orthogonal axes;
- the scanning system and the primary light source are controlled by a control unit as a function of the desired photometry of the lighting beam;
- the intensity of the light radiation distributed over the surface of the wavelength conversion device by the scanning system is constant;
- the intensity of the light radiation distributed over the surface of the wavelength conversion device by the scanning system is variable between a minimum value and a maximum value;
- the minimum value is zero;
- the system includes at least two primary light sources emitting light radiation, a scanning system being associated with each primary light source to receive the light radiation from the associated primary light source and to distribute it spatially over the surface of the wavelength conversion device;
- the light radiation emitted by the primary light source is laser radiation;
- the laser radiation has a wavelength comprised between 400 nanometers and 500 nanometers;
- the laser radiation has a wavelength close to 450 nanometers or to 460 nanometers.

BRIEF DESCRIPTION OF THE ACCOMPANYING DRAWINGS

Other goals, features and advantages of the present invention will emerge clearly from the description that will now be given in a non-limiting example of an embodiment with reference to the attached drawings in which.

Figure 1:
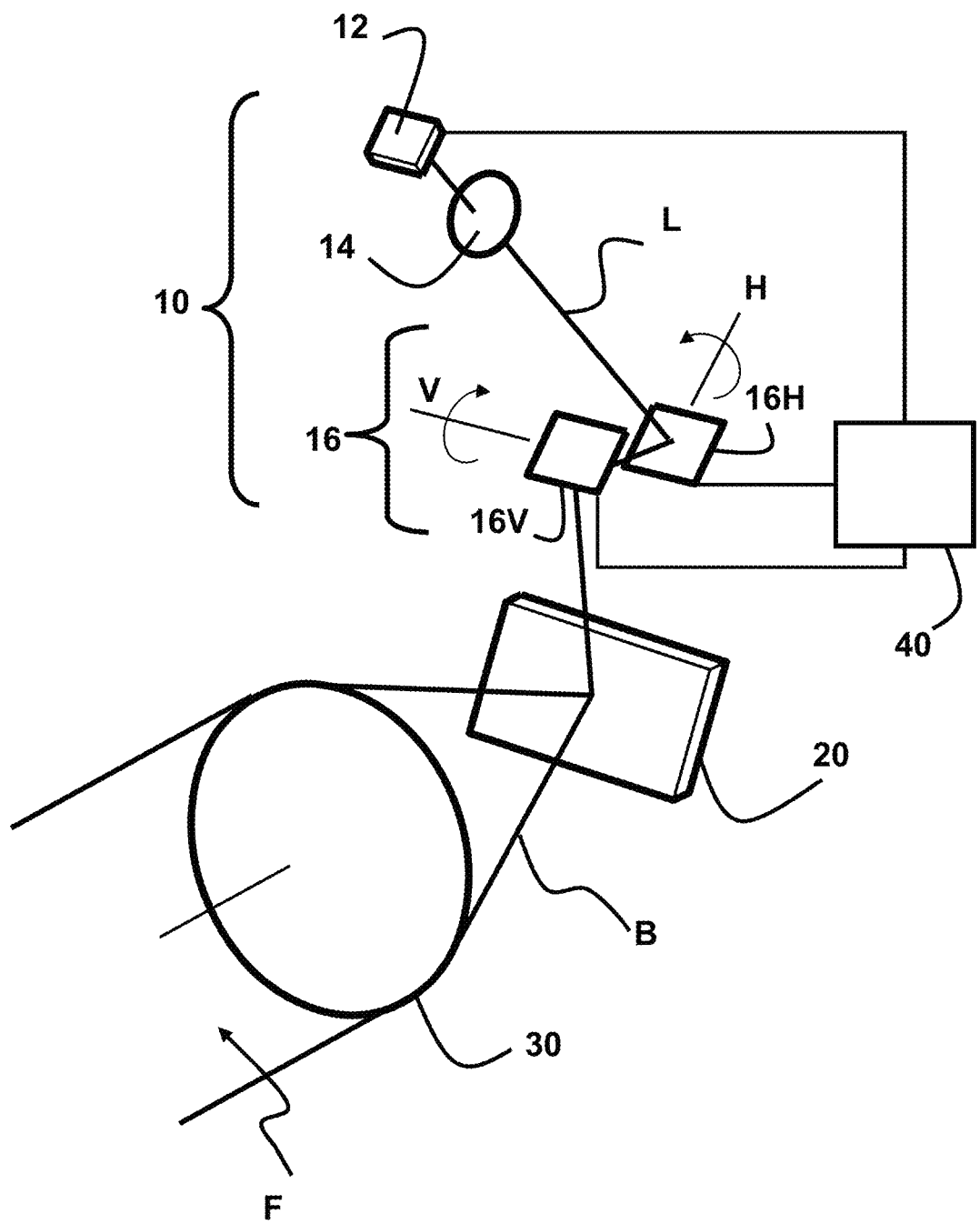
FIG. 1 shows schematically the principle of operation of an adaptive lighting system according to the present invention.
Figure 2:
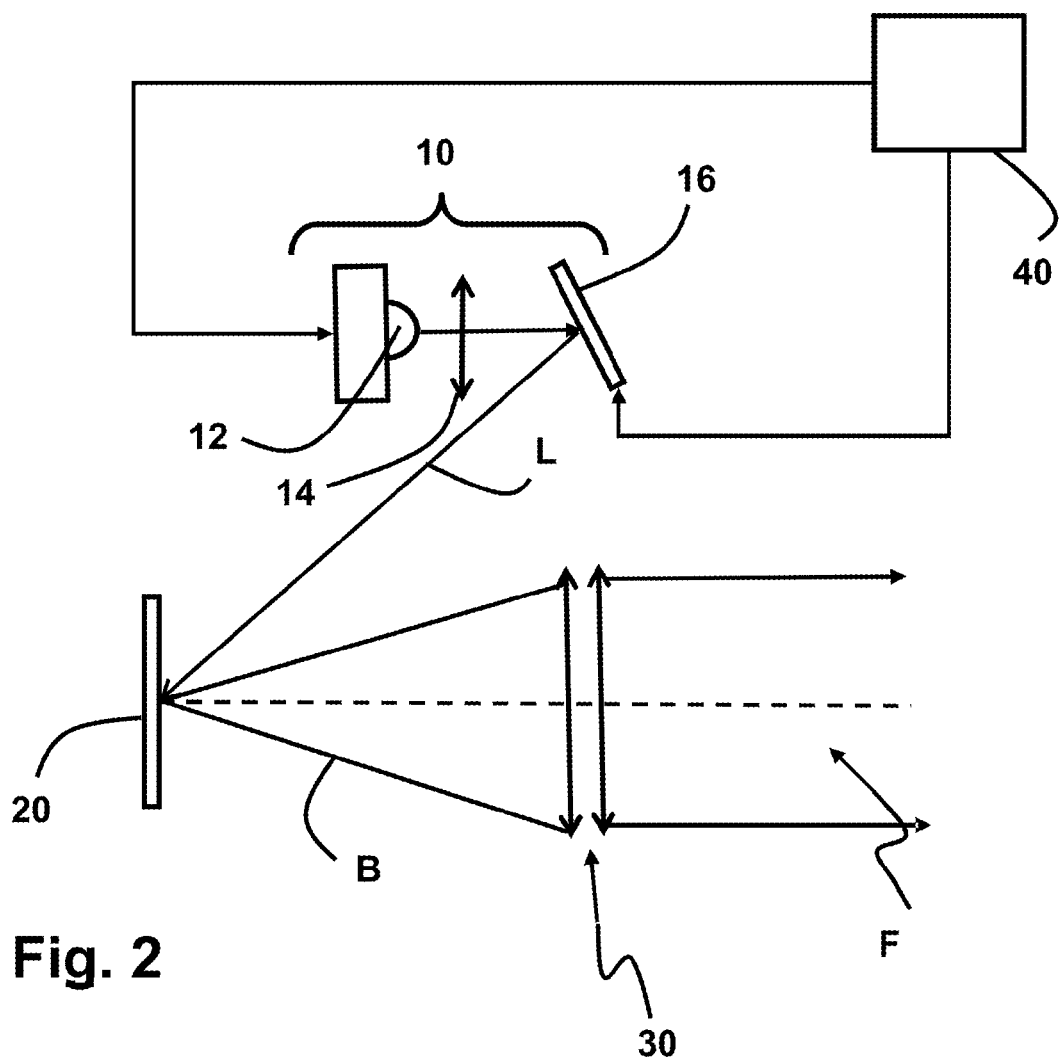
FIG. 2 shows schematically a variant of the principle of operation of an adaptive lighting system according to the present invention.
Figure 5:
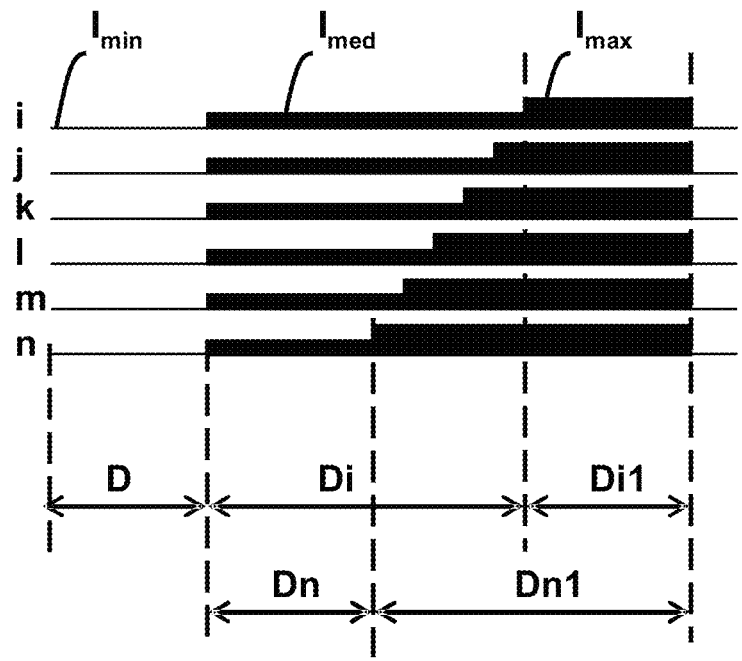
Figure 6:
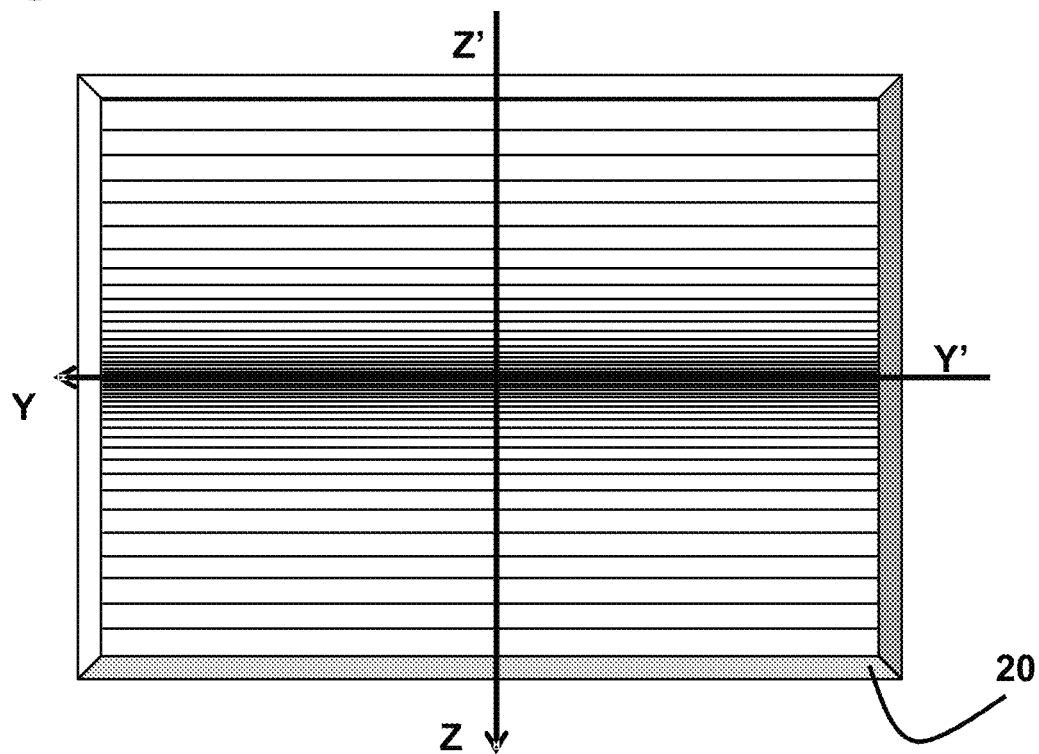
Figure 7:
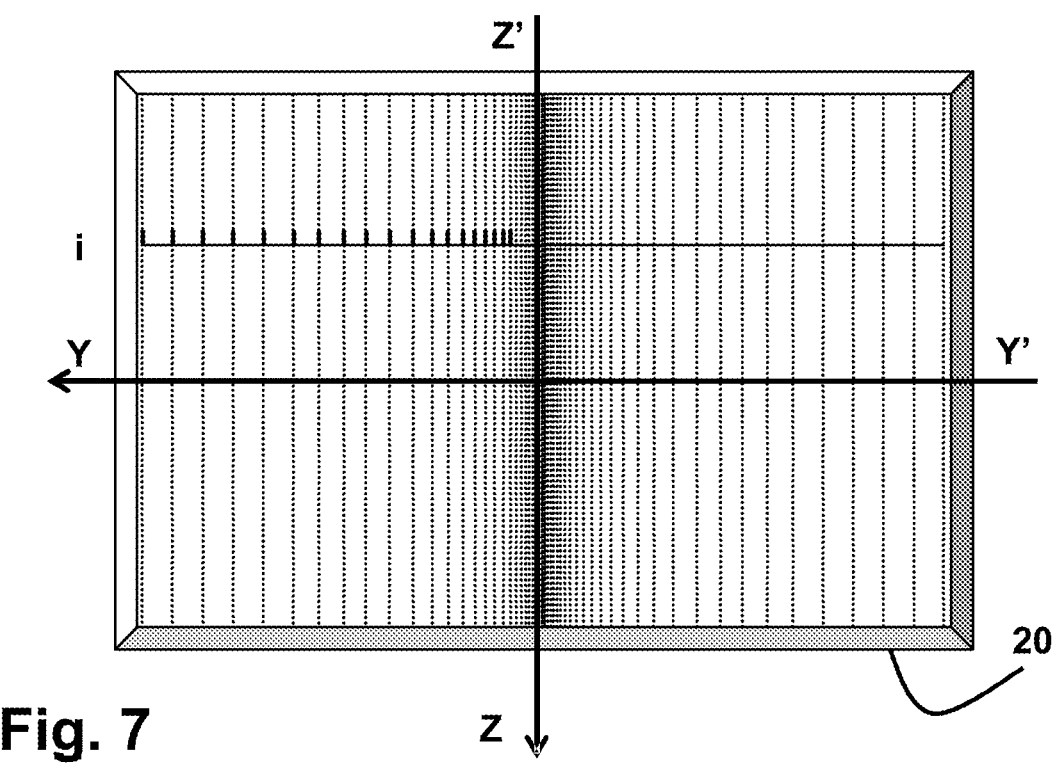
Figure 8:
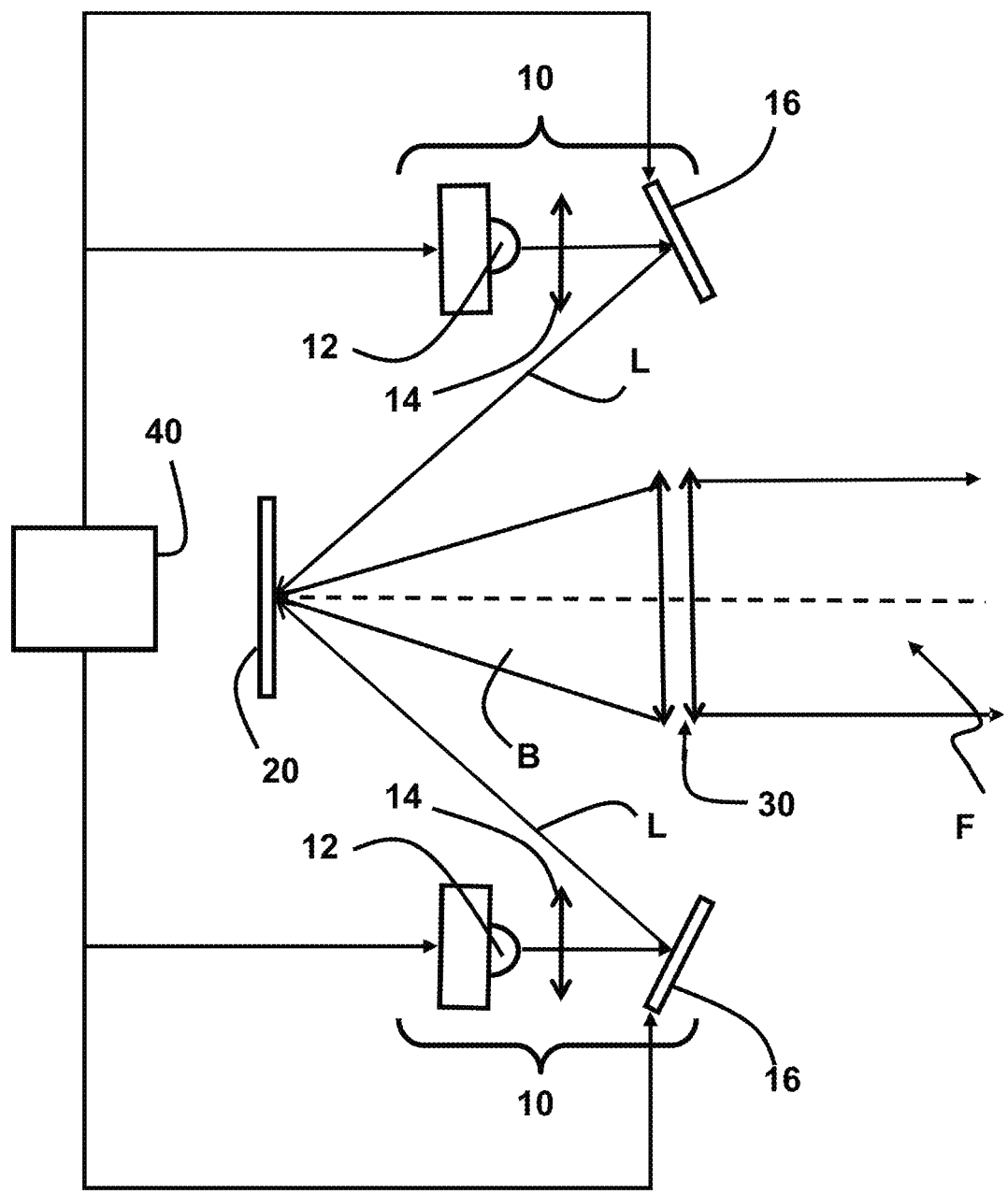
Figure 9:
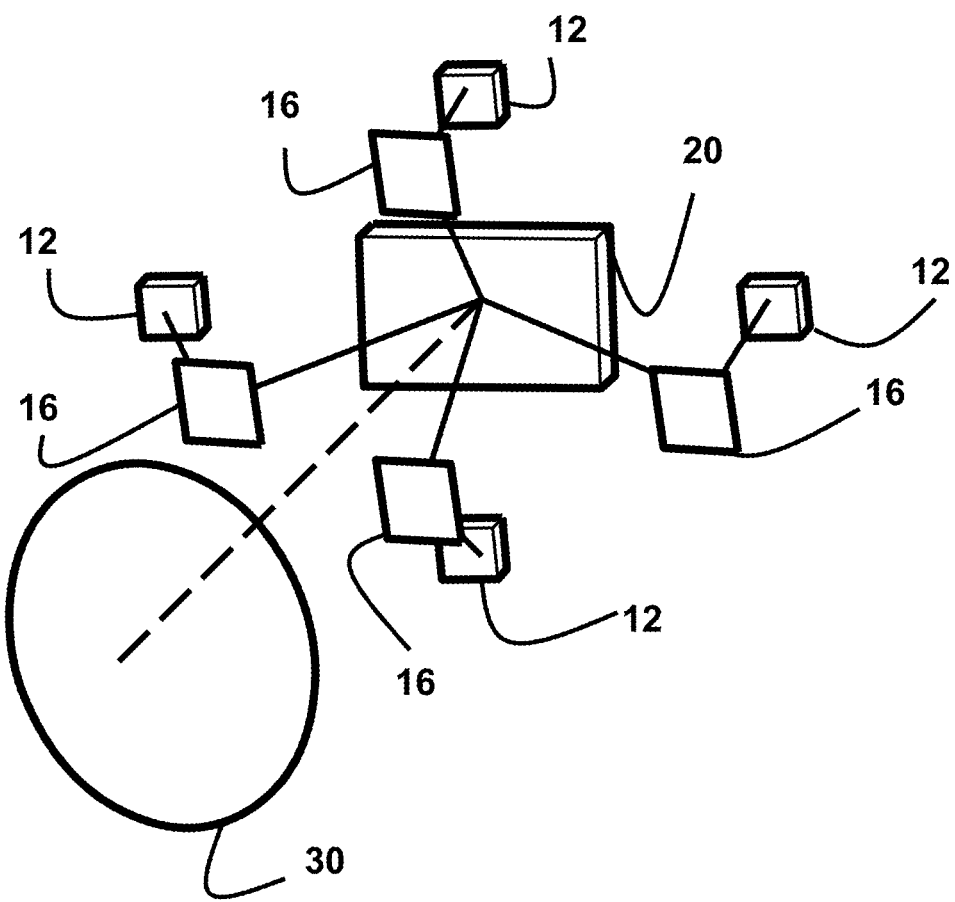

FIGS. 5, 6 and 7 show schematically examples of the scanning of the phosphor plate equipping the adaptive lighting system of FIGS. 1 and 2; and FIGS. 8 and 9 show schematically variants of the production of the adaptive lighting system of FIG. 1 or 2.

DETAILED DESCRIPTION OF THE PREFERRED EMBODIMENTS

FIGS. 1 and 2 show drawings of the principle of operation of an adaptive lighting system according to the present invention. Such a system comprises a light radiation source 10, composed of a primary light source 12, possibly focusing optics 14, and a scanning system 16.

The primary light source 12 is composed of a laser source, e.g. a diode laser, emitting e.g. laser radiation L, the wavelength of which is comprised between 400 nanometers and 500 nanometers, and preferably close to 450 or 460 nanometers. These wavelengths correspond to colors going from blue to the near ultraviolet.

The primary light source 12 can also be composed of an optical device combining, in a single beam, a plurality of laser radiations, e.g. using optical fibers or devices profiting from different polarizations of different laser sources.

In the example shown in FIG. 1, the scanning system 16 is composed of two movable mirrors 16H and 16V, oscillating around orthogonal axes, arranged such that:
mirror 16H directly receives the radiation generated by the laser source 12 and is movable around an axis H, so as to reflect the laser ray towards the mirror 16V, and
mirror 16V directly receives the laser ray from mirror 16H and is movable around an axis V, so as to reflect the laser ray towards a surface 20.

In the example shown in FIG. 2, the scanning system 16 is composed of a single micro-mirror 16, movable around two orthogonal axes, such as those used in optical scanning systems called "scanners".

The laser ray L generated by the source 12 is thus deviated along two directions by the scanning system 16 and it emerges at a solid angle intercepting all of the surface of the wavelength conversion device 20, such as, for example, a phosphor plate 20 or more exactly a plate on which a continuous and homogeneous layer of phosphor has been deposited.

In a known way, each point of the phosphor plate 20 of the wavelength conversion device 20 receiving the laser ray L, in essence monochromatic and coherent, then re-emits a light B of a different wavelength, and notably a light that can be considered as "white", that is which contains a plurality of wavelengths between about 400 nanometers and 800 nanometers, that is comprised within the visible light spectrum. This light emission is produced according to a Lambertian emission diagram, that is with a uniform light intensity in all directions.

Preferably, the phosphor is deposited on a substrate that is reflecting for the laser radiation. In this way, it can be ensured that the laser radiation that has not encountered a phosphor grain before completely traversing the phosphor layer can encounter a phosphor grain after having been reflected by the substrate.

Also preferably, the substrate is chosen from good thermally conducting materials. Such an arrangement allows a low temperature of the phosphor to be ensured, or at least prevents the temperature of same from becoming excessive. The efficiency, that is the phosphor conversion yield, is then a maximum.

A maximum conversion yield between the laser radiation and the white light is then assured.

Also preferably, the surface of the wavelength conversion device is composed of a continuous and homogeneous layer of phosphor. In fact, the division of the phosphor plate into distinct elements does not allow the desired precision in the re-emission of the white light to be obtained, particularly at the level of the points situated at the limit between two elements of the phosphor. It will be seen later that this precision is desirable, if not necessary, to obtain the desired photometry in the light beams.

The phosphor plate 20 is situated in immediate proximity to the focal plane of an optical imaging system 30, that then forms, at infinity, an image of the phosphor plate 20, or more exactly of the points of this plate that emit white light in response to the laser excitation that they receive. In other terms, the optical imaging system 30 forms a light beam F with the light B emitted by the different points of the phosphor plate illuminated by the laser radiation L.

The light beam F emerging from the optical imaging system 30 is thus directly a function of the light rays B emitted by the phosphor plate 20, themselves a direct function of the laser radiation L that scans this plate 20.

A control unit 40 controls the different components of the light radiation source L as a function of the desired photometry of the light beam F. In particular, the unit 40 simultaneously controls:

the scanning system 16 so that the laser ray L successively scans all points on the phosphor plate 20, and the laser source 12 for adjusting the intensity of the laser ray L.

It is thus possible to illuminate the phosphor plate 20 with the laser radiation L in a manner so as to form an image on this plate 20, this image being formed from a succession of lines each formed from a succession of more or less luminous points, in the same manner as an image on a television screen having a cathode ray tube.

The intensity modulation can be performed continuously, the intensity increasing or decreasing continuously between a minimum value and a maximum value. It can also be performed discretely, the intensity varying by jumps from one value to another, between a minimum value and a maximum value. In the two cases, one can foresee that the minimum value will be zero, corresponding to the absence of light.

Each point on the phosphor plate 20 thus illuminated by the laser beam L emits white light B, with an intensity that is a direct function of the intensity of the laser ray that illuminates this point, the emission being produced according to a Lambertian emission diagram.

The phosphor plate 20 can then be considered as a secondary radiation source, composed of a light image, of which the optical imaging system 30 forms an image at infinity, e.g. on a screen placed at a distance along the axis of the optical system 30 and perpendicular to this axis. The image on such a screen is the materialization of the light beam emitted by the optical system 30.

Figure 3:
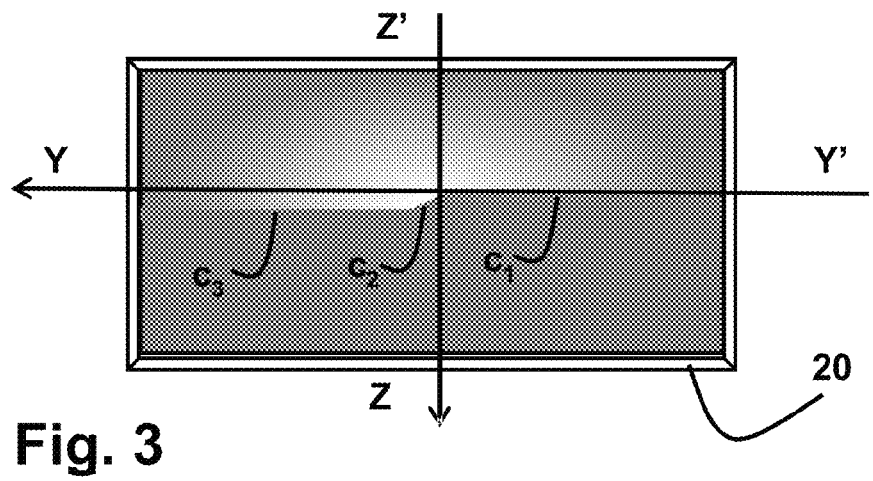
FIG. 3 shows schematically a light pattern created on a phosphor lacquer equipping the adaptive lighting system of FIG. 1 or 2.
Figure 4:
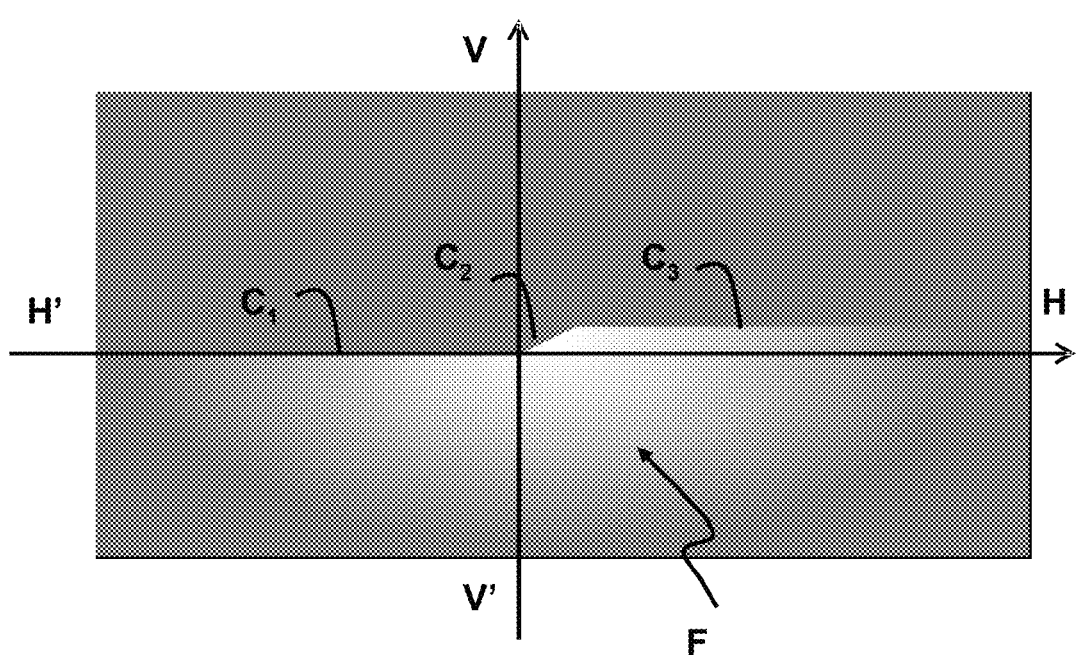
FIG. 4 shows schematically the light beam emitted by the adaptive lighting system of FIG. 1 or 2 of which the phosphor plate emits the light pattern of FIG. 3.

This is what is represented in FIGS. 3 and 4.

The secondary, white light radiation source is composed e.g. by a light image formed by scanning onto the plate 20, shown in FIG. 3: the dark zones of this figure correspond to zones that have not received radiation or have received little thereof, and the bright zone corresponds to points illuminated by the scanning of the laser radiation.

The optical system 30 then forms from this secondary radiation source an image at infinity, the light rays participating in the formation of this image then forming a light beam of which the trace on a screen placed at a distance from the optical system 30 is shown in FIG. 4.

In the example chosen, FIG. 4 shows the trace on a screen of a low beam F for a direction of driving to the right. In a known manner, such a low beam F must comprise a maximum of light near the optical axis of the crossing of the horizontal H'-H and vertical V'-V axes and slightly below the horizontal axis, in compliance with the regulations in force.

To obtain this low beam, the phosphor plate 20 is illuminated such that the points situated near the crossing of the horizontal Y'-Y and vertical Z'-Z axes and slightly above the horizontal axis Y'-Y emit a maximum of light intensity as white light, and therefore receive a maximum intensity of laser radiation.

The variations of the illumination of the different points on the phosphor plate 20 are obtained by controlling the primary source 12 in a suitable way using the control unit 40. Various possibilities are offered to obtain this result.

It was seen above that the illumination of the surface of the phosphor plate was obtained by scanning the laser radiation L coming from the primary source 12 by the system 16 that consists of one or two oscillating mirrors.

According to a first embodiment shown schematically in FIG. 5, the scanning is performed at constant speed, e.g. along the equidistant lines i, j, k, l, m and n.

Considering line i:

over a length D, the intensity of the laser radiation L is equal to a first value $I_{min}$, then, over a length Di, the intensity of the laser radiation L is equal to a first value $I_{med}$, then, over a length Di1, the intensity of the laser radiation L is equal to a second value $I_{max}$.

In addition, considering line n:

over a length D, the intensity of the laser radiation L is equal to a first value $I_{min}$, then, over a length Dn, the intensity of the laser radiation L is equal to a first value $I_{med}$, then, over a length Dn1, the intensity of the laser radiation L is equal to a second value $I_{max}$.

It is thus possible to obtain a predetermined light distribution in the pattern constituting the secondary source of radiation on the plate 20, by scanning the equidistant lines with variable intensities depending upon the pattern desired.

According to a second embodiment, shown schematically in FIG. 6, the scanning is performed at constant speed along non-equidistant lines.

In fact, it is known that a low beam such as that shown in FIG. 4 imposes a sharp cut-off. The cut-off of a low beam is a limit above which the light intensity must not exceed a value fixed by international regulations, so as not to dazzle other drivers traveling on the same road. The position in space of this cut-off is defined with high precision and the variation of the light intensity from one part to another of this cut-off is relatively abrupt.

In FIG. 4, the cut-off of the low beam F is materialized by a first horizontal segment $C_1$, a second segment $C_2$ inclined at 15° to the horizontal, and a third horizontal segment $C_3$. The segments $C_1$, $C_2$ and $C_3$ are images of the segments $c_1$, $c_2$ and $c_3$ of the pattern created on the plate 20. It is seen therefore that the position of these segments $c_1$, $c_2$ and $c_3$ on the plate 20 must be defined with great precision, also that the light intensity from one part to another of these segments must vary relatively abruptly.

This goal is attained by using scan lines that are not equidistant, as shown in FIG. 6. Near to the Y'-Y horizontal axis where a relatively high precision is needed, the invention uses scan lines closer one to another than in the regions far from this axis Y'-Y where the precision of the position is less. It will thus be possible to position the segments $c_1$, $c_2$ and $c_3$ with high precision on the plate 20 close to the horizontal axis Y'-Y, and consequently to position the segments $C_1$, $C_2$ and $C_3$ with high precision in the beam F close to the horizontal H'-H.

According to an embodiment that has not been shown, one can also use only lines that are not distributed symmetrically.

According to this embodiment, one can use laser radiation L the intensity of which is variable along each scan line as a function of the light intensity that one wishes to obtain at each of the points of each scan line, that is, at each of the points of the light beam F.

According to a third embodiment, shown schematically in FIG. 7, the scanning is performed at a variable speed. Only the scan line i is shown in this FIG. 7. Equal time intervals are shown as vertical dotted points. It is thus seen that the line i is divided into shorter and shorter intervals, each being covered in equal time, therefore at slower and slower speeds.

In FIG. 7, the shorter and shorter segments are shown as they approach the vertical Z'-Z axis. This signifies that the line i is scanned or covered more slowly near to the vertical axis than at the edges of the plate 20. If the laser beam has a constant light intensity, it results from this that the median zone of line i will be illuminated more intensely than the ends thereof, and therefore can re-emit a more intense white light.

By varying the scanning speed of the laser radiation of constant intensity, it is thus possible to modulate the intensity of the white light radiation re-emitted by different points of the secondary light source obtained by this scanning.

According to this embodiment, the intensity of the laser radiation that scans the plate 20 can stay constant and the scan lines can be equidistant one from another.

The invention thus uses a plurality of parameters:
the intensity of the laser radiation that scans the plate 20,
the scan speed of each line, and
the distance between the lines forming the light pattern on the plate 20 to confer the desired light intensity to each point of each line, and therefore to obtain a white light re-emission of a predetermined intensity.

The theoretical limit of the maximum intensity of white light that it is possible to obtain at each point on the phosphor plate 20 is a function of the maximum intensity of the light radiation that the primary source 12 can supply.

The invention makes it possible to free the system of this limit and to increase the intensity of white light re-emitted by the phosphor plate 20. The invention states that several primary sources 12 can be used to form the same pattern on the phosphor plate, as shown in FIG. 8. It is seen in this FIG. 8 that two laser sources 12 are used, each being associated with focusing optics 14 and a scanning system 16 sending the laser radiation onto the same phosphor plate 20.

Preferably, the primary sources 12 and the scanning systems 16 are controlled by the same control unit 40 to ensure synchronization of the scans. In the case where the scans are not synchronized, it is however necessary to ensure that they are such that the points of the pattern illuminated on the phosphor plate, where it is desired to obtain the maximum illumination, so as to obtain a maximum re-emission of white light, are identical in the different scans.

Another variant is shown in FIG. 9, in which four primary sources 12 are used, each associated with a scanning system 16 sending light radiation onto the same phosphor plate 20. For clarity, the focusing optics 14 and the control unit 40 have been omitted.

Preferably, the axes of rotation of the mirrors of the two distinct scanning systems 16 are parallel. Provision can be made, however, for the scan directions not to be strictly parallel, so as to improve the homogeneity, the concentration or the resolution of the pattern created on the plate 20.

Thus, by increasing the number of primary sources of laser radiation, it is possible to increase the intensity of the radiation incident on the phosphor plate 20 and consequently to increase proportionally the intensity of white light re-emitted by this plate 20. If, for example, two identical primary sources 12 are used, two times more re-emitted white light will be obtained on condition however that a rise of the temperature of the phosphor layer is avoided.

An adaptive lighting system for an automotive vehicle has thus been produced, that allows any type of predetermined lighting beam to be generated. In fact, the lighting beam is the exact image of the light pattern created on the phosphor plate by scanning the laser radiation. This lighting beam F is formed by light rays emitted by the light pattern and distributed by the optical imaging system 30 in front of the vehicle equipped with this lighting system.

Such an adaptive lighting system can thus generate a low beam as has been more particularly described. It can also generate an anti-fog beam, the cut-off line of which is flat.

For a cut-off beam, using the control unit 40, it is easy to control a translation along the vertical axis Z'-Z of the entire pattern created on the phosphor plate 20 to raise or lower the cut-off of the lighting beam. The adaptive lighting system according to the invention thus allows the function of range correction depending upon the attitude of the vehicle to be fulfilled, without the necessity of changing the vertical orientation of the optical axis of the lighting system.

For a low beam, it is possible to only vertically displace the maximum intensity situated in the immediate proximity to the cut-off in the pattern created on the phosphor plate. The result of this will be a simultaneous displacement of the maximum intensity in the lighting beam. The adaptive lighting system according to the invention thus allows the function of low beam to be achieved for driving on a highway, without the necessity of modifying the structure of the lighting system to fulfill this function. The displacement of the maximum intensity to fulfill this function is of a relatively small amplitude. A displacement corresponding to the light pattern on the phosphor plate will be facilitated if the density of scan lines is greater close to the horizontal axis Y'-Y as explained by referring to FIG. 6.

Moreover, using the control unit 40, it is easy to control a slight transition along the horizontal axis Y'-Y of the pattern created on the phosphor plate 20 to modify the orientation of the light beam in the horizontal direction. It is equally easy to modify the distribution of light by reinforcing the light intensity on one side of the Z'-Z vertical axis with respect to the light intensity on the other side of this Z'-Z vertical axis. The adaptive lighting system according to the invention thus allows the function of lighting a bend to be provided without it being necessary to change the horizontal orientation of the optical axis of the lighting system.

The present invention thus allows all of the predetermined photometric distribution to be obtained in the lighting beam projected by the optical imaging system 30. To obtain this result, using the control unit 40, it is sufficient to control the intensity of the laser radiation L and/or the scan speed and/or the density of scan lines, the re-emission intensity of the white light B at each point of the light pattern created on the phosphor plate 20. The desired photometric distribution in the light beam projected by the optical system 30 will thus be obtained.

It will thus be possible to obtain a high beam, that is without cut-off, the maximum intensity of which is situated on the axis of the lighting device, as well as all the AFS functions, e.g. town lighting, bad weather lighting or the function of gantry lighting or again the functions of Matrix Beam or Pixel Lighting. To obtain these beams or these functions, it is sufficient to modulate the intensity of the different points of the light pattern created on the phosphor plate 20.

Of course, the present invention is not limited to the embodiments that have been described, but a person skilled in the art could, on the other hand, make numerous modifications to it that enter into the framework thereof.

This is how, for example, the light intensity emitted can be increased in predetermined directions to attract the attention of the driver to details in the road scene situated in these directions. These details can be composed e.g. of obstacles detected by different sensors placed on the vehicle, or by directions to take, determined e.g. by a GPS system. Moreover, if signaling panels are detected by sensors such as cameras situated on the vehicle, the adaptive lighting system could control the light emitted towards these panels, to avoid them becoming dazzling for the driver of the vehicle, or on the other hand to improve the visibility and readability thereof.

The adaptive lighting system for an automotive vehicle that has just been described also allows, without any material modification of the projector, the latter to be rendered compliant with any legislation or European, American, Asian regulation, for driving on the right or left, etc.

While the system and apparatus herein described constitute preferred embodiments of this invention, it is to be understood that the invention is not limited to this precise system or apparatus, and that changes may be made therein without departing from the scope of the invention which is defined in the appended claims.

What is claimed is:

1. An adaptive lighting system for an automotive vehicle comprising:
    at least one primary light source emitting light radiation (L);
    a scanning system receiving the light radiation (L) from the at least one primary light source and spatially distributing it onto the surface of a wavelength conversion device;
    the wavelength conversion device receiving the light radiation (L) from the at least one primary light source and re-emitting white light radiation (B); and
    an optical imaging system receiving the white light radiation (B) re-emitted by the wavelength conversion device and projecting the white light radiation (B) in front of the vehicle to form a lighting beam, the wavelength conversion device being situated close to a focal plane of the optical imaging system;
    the scanning system and the optical imaging system being situated on a same side of the wavelength conversion device, wherein an intensity of the white light radiation (B) emitted by the wavelength conversion device is modulated between a minimum value and a maximum value and wherein the scanning is performed at variable speed;
    wherein said scanning system distributes said light radiation (L) at a variable speed that progressively decreases when scanning from at least one outer area of a surface of said wavelength conversion device toward a middle zone of said surface of said wavelength conversion device and progressively increases when scanning from said middle zone to a second outer area of said surface of said wavelength conversion device;
    wherein said scanning system comprises a first movable mirror and a second moveable mirror that oscillate along generally orthogonal axes to distribute said light radiation (L) at said variable speed and wherein said first moveable mirror receives said light radiation generated by said at least one primary light source and reflects it towards said second moveable mirror which receives said light radiation from said first moveable mirror and directs it to said wavelength conversion device.

2. The adaptive lighting system according to claim 1, wherein the scanning is performed along equidistant lines.

3. The adaptive lighting system according to claim 1, wherein the scanning is performed along lines of variable separation.

4. The adaptive lighting system according to claim 1, wherein the surface of the wavelength conversion device is composed of phosphor.

5. The adaptive lighting system according to claim 4, wherein the phosphor is deposited on a substrate that is reflecting for the light radiation (L).

6. The adaptive lighting system according to claim 4, wherein the phosphor is deposited on a substrate chosen from good thermally conducting materials.

7. The adaptive lighting system according to claim 6, wherein the surface of the wavelength conversion device is composed of a continuous and homogeneous layer of phosphor.

8. The adaptive lighting system according to claim 1, wherein the intensity of the white light radiation (B) emitted by the wavelength conversion device can be continuously modulated between a minimum value and a maximum value.

9. The adaptive lighting system according to claim 8, wherein the minimum value is zero.

10. The adaptive lighting system according to claim 1, wherein the scanning system receiving the light radiation (L) from the primary light source is composed of either said first and second movable mirrors or of a single, micro-mirror movable around two orthogonal axes.

11. The adaptive lighting system according to claim 1, wherein the scanning system and the primary light source are controlled by a control unit as a function of the desired photometry of the lighting beam (F).

12. The adaptive lighting system according to claim 11, wherein the intensity of the light radiation (L) distributed over the surface of the wavelength conversion device by the scanning system is constant.

13. The adaptive lighting system according to claim 11, wherein the intensity of the light radiation (L) distributed over the surface of the wavelength conversion device by the scanning system is variable between a minimum value and a maximum value.

14. The adaptive lighting system according to claim 13, wherein the minimum value is zero.

15. The adaptive lighting system according to claim 1, wherein the system includes at least two primary light sources emitting light radiation (L), a scanning system being associated with each primary light source to receive the light radiation (L) from the associated primary light source and to distribute it spatially over the surface of the wavelength conversion device.

16. The adaptive lighting system according to claim 1, wherein the light radiation (L) emitted by the primary light source is laser radiation.

17. The adaptive lighting system according to claim 16, wherein said laser radiation has a wavelength comprised between 400 nanometers and 500 nanometers.

18. The adaptive lighting system according to claim 17, wherein the laser radiation has a wavelength close to 450 nanometers or to 460 nanometers.

19. The adaptive lighting system according to claim 1, wherein said light radiation has a wavelength comprised between 400 nanometers and 500 nanometers.

20. The adaptive lighting system according to claim 1, wherein said at least one outer area is a border of said wavelength conversion device.

21. The adaptive lighting system according to claim 1, wherein said middle zone is associated with at least one of a vertical or horizontal axis of said wavelength conversion device.

* * * * *

UNITED STATES PATENT AND TRADEMARK OFFICE
CERTIFICATE OF CORRECTION

Page 1 of 1

PATENT NO. : 9,677,736 B2
APPLICATION NO. : 13/951639
DATED : June 13, 2017
INVENTOR(S) : Jean-Paul Ravier et al.

It is certified that error appears in the above-identified patent and that said Letters Patent is hereby corrected as shown below:

On the Title Page

In the Title, delete "AUTOMOBILE VEHICLE" and insert --AUTOMOTIVE VEHICLE-- therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*